United States Patent [19]

Borowiec et al.

[11] 4,198,174
[45] Apr. 15, 1980

[54] TELESCOPIC LOAD BINDER AND METHOD OF ASSEMBLY

[75] Inventors: Richard A. Borowiec, Grand Island; Kenneth D. Schreyer, Clarence, both of N.Y.

[73] Assignee: Columbus McKinnon Corporation, Tonawanda, N.Y.

[21] Appl. No.: 952,347

[22] Filed: Oct. 18, 1978

[51] Int. Cl.² ............... F16B 7/06; F16G 11/12
[52] U.S. Cl. ............... 403/44; 403/118; 254/67; 29/175 R
[58] Field of Search ............... 403/43, 44, 45, 46, 403/47, 48, 118; 254/67; 29/175 R

[56] References Cited

U.S. PATENT DOCUMENTS

| | | | |
|---|---|---|---|
| 804,696 | 11/1905 | Winterhoff | 403/43 X |
| 2,848,259 | 8/1958 | Huber | 403/46 |
| 2,969,023 | 1/1961 | Chapman | 254/67 X |
| 3,105,675 | 10/1963 | Blackburn | 254/67 |
| 4,081,219 | 3/1978 | Dykmans | 403/43 |

FOREIGN PATENT DOCUMENTS

| | | | |
|---|---|---|---|
| 2310152 | 9/1974 | Fed. Rep. of Germany | 403/43 |
| 1475254 | 6/1977 | United Kingdom | 403/43 |

*Primary Examiner*—Andrew V. Kundrat
*Attorney, Agent, or Firm*—Bean, Kauffman & Bean

[57] ABSTRACT

A telescopic load binder (1) with a tubular barrel (2) and a pair of oppositely threaded members (7,8) threaded into the opposite ends of the barrel and method of assembling same. When assembled, the load binder is designed to prevent subsequent inadvertent disassembly and includes means (13,14) placed on the threads of the members to prevent their removal from the barrel without breaching the barrel itself. A threaded cylindrical insert (12) is inserted into the barrel at one end and enables and facilitates load binder assembly.

5 Claims, 4 Drawing Figures

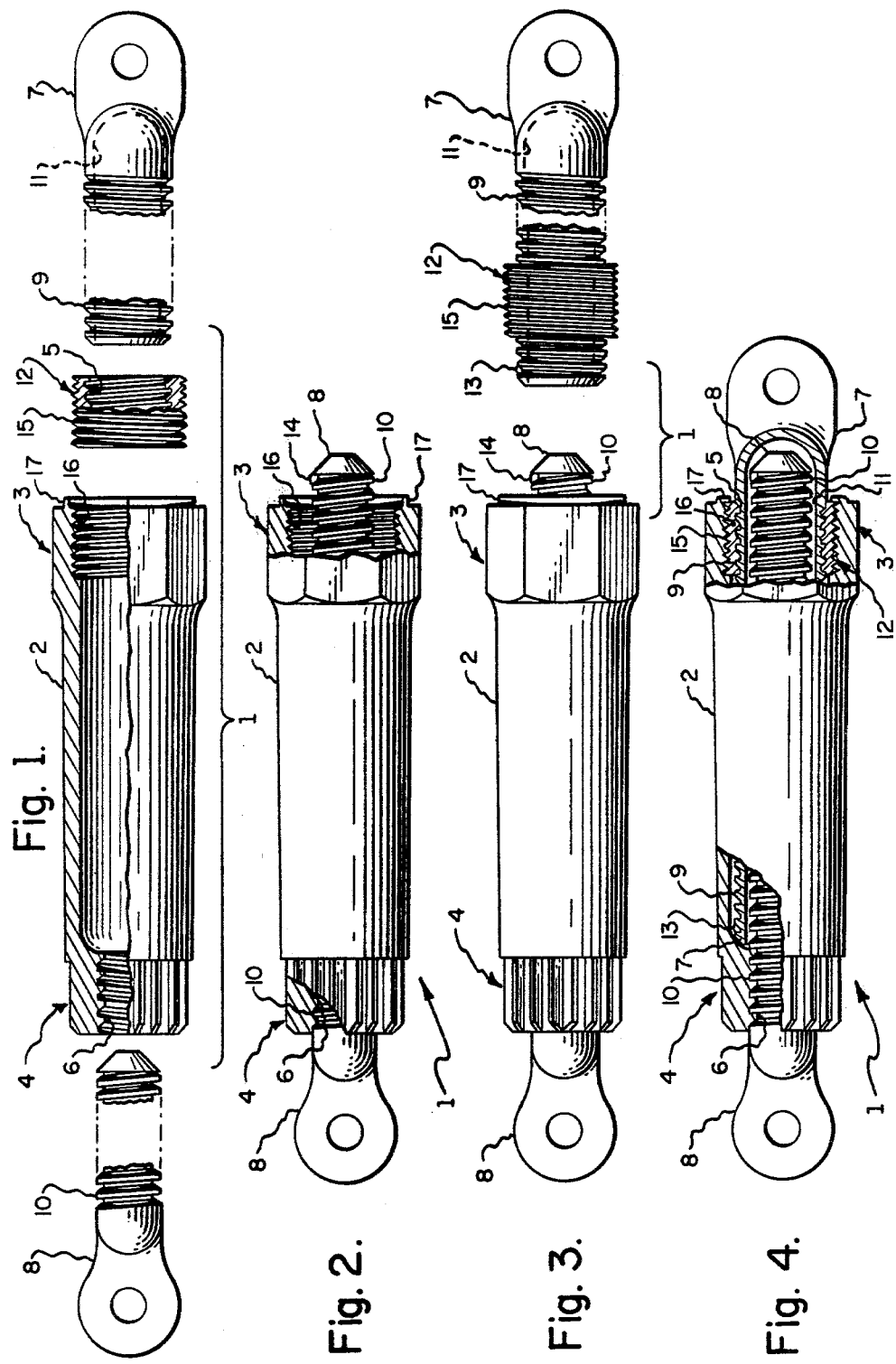

TELESCOPIC LOAD BINDER AND METHOD OF ASSEMBLY

TECHNICAL FIELD OF THE INVENTION

The present invention relates generally to chain securing and tensioning devices which are generally known as turnbuckles or load binders. More particularly, the invention relates to telescopic load binders having a central rotatable barrel member into which a pair of threaded tension members are advanced upon rotation of the barrel.

BACKGROUND OF THE INVENTION

Telescopic turnbuckles are well known as exemplified by U.S. Pat. Nos. 1,971,472; 2,220,288; and 2,673,632. Each of these patents disclose turnbuckle type tensioning devices in which the reach of the device is limited by the fact that the oppositely threaded, opposite end tension members are both formed of a rod stock having the same diameter so that the maximum contracted configuration of the turnbuckle is achieved when the opposite members abut one another.

U.S. Pat. No. 310,767 and Canadian Pat. No. 601,529 issued in 1962 to John R. Huber of the United States, disclose load binder concepts in which the opposite threaded members comprise a rod of a first small diameter and a tube of a second larger diameter, the small diameter being smaller than the interior diameter of the opening of the tube so that the smaller diameter member may be telescopically received within and extend into the tubular member, thereby considerably extending the reach of the load binder over the previously mentioned patents.

THE INVENTION

The present invention is of the latter type of telescopic load binder in which the opposite threaded members telescope not only relative to and into an integrally formed axially extending tubular barrel body but also into and relative to one another. The oppositely threaded opposite tension members are adapted to threadingly engage with first and second portions at first and second opposite ends of the axially extending tubular body, the end portions having threads of opposite handedness on their respective inner surfaces.

Advancements relative to the prior art designs in the areas of simplicity of construction and assembly as well as in the area of reach extension have been made by the present invention by providing the smaller diameter member with a thread pitch which is greater than the thread pitch of the larger diameter, tubular threaded member and by providing the smaller diameter member with a threaded length which is approximately equal to the overall length of the tubular body. Additionally, a cylindrical insert, threaded on both its interior and exterior surfaces, is provided for insertion into one end of the axially extending tubular body. The interior threads are adapted to mate with the exterior threads of the tubular tension member while the exterior threads are adapted to mate with threads formed on the interior of one end of the tubular body. With this design, the complicity and cost of the components of the load binder and its assembly are greatly reduced in comparison to the prior art designs, especially in comparison with the design of the load binder disclosed in Canadian Pat. No. 601,529.

The load binder of the present invention consists of a total of four elements which compares favorably to the minimum number of six elements required by the Canadian patent. Additionally, since the axially extending tubular body of the present design is integrally formed, the diameter of the body is greatly reduced in comparison to the patented device of the Canadian patent. Reduction in diameter has the dual advantages that significantly less material is required for its fabrication and there is a greatly reduced tendency for the load binder body itself to contact a portion of the load. Such contact may render rotation of the load binder body more difficult, place radially directed forces on the parts of the load binder, which forces tend to greatly increase wear thereof, and may damage the goods with which the load binder has come in contact.

As above stated, the present invention greatly simplifies the cost of fabrication of the load binder by enabling a simple and straightforward assembly technique. The method of assembling the telescopic load binder of the present invention includes steps of threading the smaller diameter threaded rod member into one end of the load binder's tubular body until the leading end of the threaded rod penetrates through the body to its opposite end at which point the leading end becomes accessible for thread deformation by the deposition of a weld bead, threading the tubular threaded member into the cylindrical insert piece until the tubular member extends through the insert thereby making the leading end of the tubular member also accessible for thread deformation, threading the cylindrical insert into the remaining end of the load binder body, and fastening the insert into the load binder body so as to prevent its removal therefrom. After these simple steps have been accomplished, the load binder has been assembled in a manner which prevents removal of the oppositely extending tension members therefrom; a requirement which enhances the safety of the load binder in use in that it prevents sudden release of the load when the threaded members become disengaged from the tubular body by excessive rotation of the tubular body.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 1 is a partially broken away exploded view of the components of the load binder of the present invention;

FIG. 2 shows the step of depositing a weld bead on the leading end of the rod-like threaded tension member after it has been screwed all the way into the load binder body;

FIG. 3 shows the step in which a weld bead is deposited on the leading end of the tubular threaded tension member after it has been threaded into the cylindrical insert; and FIG. 4 shows the load binder of the present invention after it has been completely assembled by screwing the cylindrical insert into the remaining end of the load binder body and fixing the cylindrical insert therein.

DESCRIPTION OF THE BEST MODE OF THE INVENTION

While the invention is susceptible of various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims, to the full range of their equivalents.

Turning now to an examination of FIG. 4, the construction of the load binder 1 may be seen to include an axially extending tubular body 2 or barrel with first and second end portions 3 and 4 respectively at the barrel's first and second opposite ends. End portion 3 is formed on its exterior in the shape of a hexagonal nut while end portion 4 is shaped on its exterior in the form of a multi-lobed star. Accordingly, the load binder barrel 2 may be turned either by applying an open ended wrench to portion 3 or a specially designed ratchet (the details of which form no part of the present invention and which are therefore not discussed herein) to end portion 4.

Each of the first and second opposite end portions 3 and 4 includes threads 5 and 6 of opposite handedness on their respective inner surfaces. Threads 5 and 6 are adapted to mate with respective exterior threads 9 and 10 formed on opposite first and second axially extending threaded tension members 7 and 8. Tension member 7 is formed from a tube whose diametral inner opening is larger than the outside diameter of the threaded member 8 formed from rod stock. If desired, each of the tubular and rod members 7 and 8 may be flattened at their outer ends and may be drilled to form an eye connector, as shown, for attachment to a suitable piece of hardwear such as a clevis chain grab hook. Alternatively, the outboard ends of members 7 and 8 may be fashioned in any of a number of other ways such as the formation of an integral hook or a clevis end.

As can be seen from an examination of FIG. 4, a critical feature of the members 7 and 8 is that the thread pitch of the threads 10 of member 8 is greater than the thread pitch of the threads 9 of member 7 and that the length of the threaded portion 10 of member 8 is at least great enough to cause the leading end of member 8 to penetrate into the body 2 of the load binder 1 far enough to permit external access to the threads on its leading end at the position of end portion 3 so that these threads may be deformed so as to prevent subsequent removal of threaded member 8 from load binder body 2. The fact that the threads 10 have a pitch greater than that of threads 9 permits both threaded members 8 and 9 to be moved from their full-out to their full-in positions by the same number of rotations of the load binder body 2. As a result of these design features, the reach of the load binder 1 of the present invention has been increased by a distance equal to the difference in threaded lengths of members 7 and 8 without appreciably increasing the amount of material and weight of the load binder itself.

It will be noted from a close examination of FIG. 4 that the end portion 3 of load binder body 2 comprises a cylindrical insert 12 having both interior and exterior threaded surfaces 5 and 15 respectively. Cylindrical member 12 is adapted to be fixed in the first end of load binder body 2 by threading threads 15 into mating threads 16 formed on the interior of the first end of the load binder body 2 and cylindrical detent flange 17 is provided to be swaged over to trap cylindrical insert 12 in its inserted position. While a cylindrical insert 12 with exterior threads 15 is the preferred embodiment, it is evident that cylindrical insert 12 could equally as well be formed without threads 15. An alternative design for example might include cylindrical insert 12 with an exterior cam adapted to be slid into an axially extending cam slot formed in the first end of load binder body 2.

It should be noted that in the preferred embodiment, threads 9 of first tension member 7 are left hand threads while threads 10 of the second threaded member 8 are right hand threads. The respective internal threads 5 and 6 are also left and right handed threads respectively adapted to mate with and threadingly receive respective members 7 and 8. Additionally, in the preferred embodiment, threads 15 of cylindrical insert 12 are also left hand threads so that continued rotation of the load binder body 2 after the first tension member 7 has bottomed out in its completely inserted position tends to screw cylindrical insert 12 further into the load binder body 2 rather than producing a tendency to unscrew cylindrical insert 12: which tendency could lead to disassembly of the load binder in its condition of maximum tension.

The method of assembly can easily be seen from the figures by sequentially examining FIGS. 2, 3 and 4. The first two steps are shown in FIG. 2 and the right hand portion of FIG. 3 and include threading member 8 into body 2 and member 7 into the cylindrical insert 12. Member 8 is threaded to its maximum extent so that its leading end approaches or extends out of the opposite end of the load binder body 2 (as shown in FIG. 2) at which point threads 10 are deformed by a thread deformation means such as a weld deposit placed thereon. In this respect it is important that the threaded portion 10 of member 8 be sufficiently long that the leading end of member 8 becomes accessible for this thread deformation step at the first end of load binder body 2. The thread deformation step may not be the deformation of the thread 10 by a weld bead 14 but may equally as well be a swaging process or the insertion of a set screw therein. Be that as it may, the thread deforming step is facilitated by the fact that cylindrical insert 12 has not yet been inserted into the first end of the load binder body 2. Similarly, a thread deforming weld bead 13 or some other suitable thread deforming means is placed on the threads of the leading end of member 7 after it has been screwed into cylindrical insert 12.

Following these initial steps, cylindrical insert 12 and captured member 7 are then screwed or otherwise inserted into the first end of load binder body 2 and fixed therein. In the preferred embodiment, cylindrical axially extending flange 17 is bent over or otherwise swaged or deformed to form a lip which captures cylindrical insert 12 in its inserted position thereby preventing its subsequent removal. This final bending or swaging step successfully completes the assembly of the simple, inexpensive and improved telescopic load binder of the present invention.

Returning now to an examination of the figures it can be seen that the axially extending recesses or teeth are disposed around the exterior circumference at a position adjacent to the end having a minimum bore or at the second end portion 4 where threaded tension member 8 is threadedly received. This location enables the largest width of the load binder 1 to be minimized so that the load binder may be threaded through narrow apertures such as are formed by the channels or stake pockets which support a truck's rub rails. This practice secures the chain against lengthwise movement along the truck body.

What is claimed is:

1. A load binder (1) of the type having an integrally formed axially extending tubular body (2) with first and second end portions (3,4) at first and second opposite ends thereof, said end portions having threads (5,6) of opposite handedness on their respective inner surfaces, and including first and second axially extending threaded members (7,8) with mating exterior threads (9,10), adapted to be threaded into the respective end portions (3,4), said first member (7) having an axially extending void (11) adapted to telescopically receive therewithin said second member (8), said second member (8) having an outside diameter smaller than the inside width of said void (11), characterized in that said first end portion (3) includes a cylindrical insert (12) having said thread (5) formed on its inner surface, said cylindrical insert (12) being fixedly inserted into said axially extending tubular body (2) at its first end (5), said load binder further including one or more axially extending recesses disposed around the exterior circumference of said second end portion (4), said recesses adapted to engage with a wrench for turning said tubular body (2).

2. A method for assembling a telescopic load binder (1) of the type having an axially extending integrally formed body (2) with first and second internally threaded opposite end portions (3,4), said first end portion (3) including a cylindrical insert (12) fixedly inserted into said body and having interior threads (5) on its inner surface with a handedness opposite to that of threads (6) on the inside of said second end portion and having first and second threaded members (7,8) having threads of opposite handedness respectively adapted to be threaded into said first and second end portions with the threads of said first member (7) having a smaller pitch than the threads of said second member, said second member having a second threaded length which exceeds the threaded length of said first threaded member by at least the threaded axial length of said first end portion, wherein said method characterized in the steps of:

a. threading said second threaded member (8) into said second end portion (4) until the end of said second member (8) penetrates through said body (2) to the outer opposite end portion (3);

b. deforming the threads (10) on said end of said member (8) by direct access to said second member through the end of said first end portion so as to prevent removal of said member (8) from said body (2);

c. threading said insert (12) onto said first member (7) until said first member (7) extends through said insert (12);

d. deforming the threads (9) of said first member (7) so as to prevent its removal from said insert (12);

e. inserting said insert (12) into the other of said opposite end portions (3) of said body (2); and f. fastening said insert (12) into said body (2) so as to prevent its removal therefrom.

3. The method as recited in claim 2 characterized in that said cylindrical insert (12) includes exterior threads (15) and said body (2) includes mating interior threads (16) adapted to threadingly receive said exterior threads (15) and characterized in that said step of inserting said insert (12) includes screwing said insert (12) into the interior threads (16) of said body (2).

4. The method as recited in claim 3 characterized in that said body (2) includes an axially extending detent means (17) at its second end and characterized in that said step of fastening said insert (12) includes the step of swaging said detent means (17) to trap said insert (12).

5. The method as recited in claim 4 characterized in that said steps of deforming said threads, (9,10) of said members (7,8) includes depositing weld beads (13,14) on said threads (9,10).

* * * * *